Patented Dec. 23, 1941

2,266,793

UNITED STATES PATENT OFFICE 2,266,793

PIGMENT COMPOSITION AND PROCESS OF MAKING SAME

Charles F. Oppermann, Wilmington, Del., assignor to E. I. du Pont de Nemours & Company, Wilmington, Del., a corporation of Delaware No Drawing. Application January 27, 1939, Serial No. 253,119

8 Claims. (Cl. 134—58)

This invention relates to the production of finely divided pigment materials. More particularly it relates to a process for producing pigment materials of such fineness that they can be used in coating compositions, such as enamel and flat paints, without the necessity of grinding said paints.

It is well known in the art that many pigment materials such as titanium oxide, titanates, barium sulfate, lithopone, zinc sulfide, and the like, often contain relatively large quantities of coarse aggregates. Thus lithopone, produced by calcination or other heat-treatment of the reaction product obtained by mixing together solutions of barium sulfide and zinc sulfate respectively, contains hard gritty particles. These particles prevent the formation of a smooth, unbroken, and glossy film of a coating composition when made from such a product. This detrimental property of such pigments is a direct result of the conditions obtaining in their method of manufacture. The precipitation step tends to form aggregates of fine particles and the subsequent treatments, such as drying and calcination, cement these aggregates by compacting and sintering.

It has been recognized in the art for a long time that pigment materials must be in a relatively finely divided condition to insure the formation of paints capable of producing smooth and glossy paint films when said pigment materials are milled with paint vehicles. Furthermore, the present tendency on the part of pigment users is to demand pigment materials which are even more finely divided than heretofore and which can be incorporated in a paint vehicle by simple mixing or stirring, as in a pony mixer, to produce a paint which forms films of smooth unbroken surface without any irregularities visible to the naked eye. Pigment materials manufactured by prior art processes do not fulfill this requirement.

A commonly used method of producing finely divided pigment materials is by wet-milling. Substantial improvements in the art of wet-milling lithopone and titanium oxide pigments are disclosed, for example, in U. S. Patents 1,826,131, 1,937,037, and 2,044,941. These processes comprise a continuous grinding and hydroseparation circuit in which the calcined pigment material is ground and deflocculated in aqueous media with the aid of deflocculating agents, for example sodium silicate, and the fines are separated from the coarse by hydroseparation and the coarse are reground. The overflow fraction, constituting a deflocculated suspension of pigment particles having substantially a particle size of 15 microns or less, is coagulated in order to permit economical separation of the pigment from the water and the pigment is then filtered and dried. The coagulation operation forms aggregates of the fine particles and the subsequent drying treatment tends to cement these aggregates together, thus largely offsetting the beneficial effects of the prior wet milling process. As a consequence, dry-milling of the dried wet-milled pigment is resorted to in order to break up the lumps formed on drying. This dry-milling effects sub-division which is satisfactory for some purposes. However, it does not produce pigment materials, such as lithopone or titanium oxide pigments, which can be mixed in paint vehicles without milling of the paint to produce smooth glossy coatings.

For a better understanding of the characteristics desired in finely divided pigment materials it will be necessary to explain the various terms used herein and the methods of testing employed:

Texture

The values for texture are determined according to modification A of the "Krebs texture test for pigments" outlined on pages 511–512 of the 8th edition of "Physical and Chemical Examination of Paints, Varnishes, Lacquers and Colors," by Henry A. Gardner, January, 1937. The directions for this test are as follows:

Using a spatula with a flexible blade (1½ by 6½ inches), mix the pigments with a quick drying varnish of fairly good wetting properties. The amount of pigment and varnish varies with the nature of the pigment. For lithopone, use about 1.5 grams pigment and 1.5 cubic centimeters varnish, and for titanium dioxide use about 1.5 grams pigment and 1.8 cubic centimeters varnish. Give the paste 50 double rubs, using strokes about 12 inches long. Collect and re-spread the paste after each 10 rubs. Make a wedge-shaped film on glass by drawing a 3½ inch doctor blade, one end of which is resting on a steel strip 0.003 inch thick, over the paint. Allow the film to dry in a dust-free atmosphere and then examine it under illumination at grazing incidence, using a high intensity microscope lamp. Grading is most conveniently done against standards and is based on the size and number of coarse particles projecting from the thin portion of the wedge film.

The value for texture thus obtained is a measure of the number of particles of the order of 10 microns. The standards which I use range from "1" at the bottom of the scale, representing a film containing a large number of 10 micron particles and with a sand-like appearance, to "17" at the top of the scale representing a film with practically no perceptible coarse particles, smooth and glass-like in appearance. The intermediate standards represent gradual and evenly spaced graduations from one extreme to the other.

*Paint grit*

The values for paint grit are determined by a convenient and practical test for the semiquantitative determination of coarse pigment particles. The pigment is mixed with a quick drying varnish in a conventional manner, the exact proportions of pigment to varnish varying with the nature of the pigment. In the case of lithopone, 250 grams of pigment is mixed with 93.8 grams of varnish while with titanium dioxide 200 grams of pigment is mixed with 106 grams of varnish. The resultant paste is passed once through a roll mill with the rolls set 0.0015 inch apart. Steel strips are used for setting the mill and withdrawn before grinding. The ground paste is reduced to paint consistency by addition of a further quantity of the quick drying varnish; in the case of the liothopone paste 54 grams of varnish is added to 300 grams of paste while with the titanium dioxide paste 82 grams of varnish is added to 265 grams of paste. The resultant paint is allowed to stand 16 hours. A uniform film of the paint is made on glass by drawing over the paint a 3½ inch doctor blade, both ends of which are resting on steel strips 0.0015 inch thick. The film is allowed to dry in a dust-free atmosphere and is then examined under illumination at grazing incidence, using a high intensity microscope lamp, and compared for film fineness and for the presence of coarse gritty aggregates against a set of arbitrary standards. The standards which I use range from "1" at the bottom of the scale, representing a film with extremely coarse particles, and sand-like in appearance to "16" at the top of the scale, representing a film with practically no perceptible coarse particles, smooth and glass-like in appearance. The intermediate standards represent gradual and evenly spaced graduations from one extreme to the other.

The value for paint grit thus obtained is a measure of the number and size of particles protruding above the surface of the film, and is especially a measure of the quantity of grit particles of from about 10 to about 40 microns in size.

*Mix-in grit*

A test for the actual fineness of dry pigment incorporated in paint by simple mixing has been developed for the determination of the superfine properties of the novel pigment of this invention. This test is as follows:

500 grams of pigment and approximately 100 grams of a linseed oil vehicle consisting of "Z" body kettle bodied linseed oil of 11 acid number, and petroleum spirits as defined by A. S. T. M. tentative standard D235-26T issued 1926, in the proportions of 52% by weight "Z" body kettle bodied linseed oil and 48% by weight petroleum spirits, are mixed for 20 minutes in a pony mixer of the type referred to at page 1283 of Perry's "Chemical Engineers' Handbook" (1934) and more particularly described as pony mixer 23G of the Kent Machine Works. Said mixer is provided with a receptacle or pot 7 inches in diameter and 5 inches deep rotating at the rate of 60 revolutions per minute, the paddles of said pony mixer rotating in the reverse direction at the rate of 64 revolutions per minute. The actual weight of linseed oil vehicle employed varies with the nature of the pigment being tested. The linseed oil vehicle is added to the 500 grams of pigment in just sufficient amount so that the paste obtained at the end of 20 minutes mixing in the aforementioned pony mixer gives a penetrometer reading of 25 mm. with 150 gram load, when tested according to the procedure outlined on pages 596-597 of the 8th (January, 1937) edition of "Physical and Chemical Examination of Paints, Varnishes, Lacquers and Colors," by Henry A. Gardner, and employing the cone type penetrometer specified for A. S. T. M. tentative standard D217-27T, described on pages 930-35 of the "Proceedings of the American Society for Testing Materials," vol. 27, part I (1927). The sides and paddles of the pony mixer are scraped down at the end of 1 minute of mixing time and again at the end of the 20 minute mixing period. An additional quantity of the aforementioned linseed oil vehicle is then added to the paste in amount sufficient to provide 250 grams of said vehicle in the paste, the mixture is stirred for an additional minute in the pony mixer and is then removed from said mixer. 1.25 grams of 6% cobalt naphthenate drier and 3.125 grams of 24% lead naphthenate drier are then added to the mixture with stirring. A sample of the resultant pigment-linseed oil vehicle paste is thinned by addition of vehicle consisting of 52 parts by weight of the aforementioned "Z" body linseed oil, 48 parts by weight petroleum spirits, 0.5 part by weight 6% cobalt naphthanate drier and 1.25 parts by weight 24% lead naphthanate drier to a consistency of 7.5N, as determined by the modified Stormer viscometer test described on pages 1273-1277 of the aforementioned Perry's "Chemical Engineers' Handbook," published in 1934 by McGraw-Hill Book Company, Inc.

The paint thus made from the mixed paste can be tested in either one of two ways. The first method is to brush out the paint on a bare tin panel making sure that the film is less than 0.001 inch in thickness. The brushout is then graded against panels of prior art ground enamels brushed out in the same manner. The standard panels contain practically no grit or objectionable particles, being prepared from paints obtained by milling prior art pigments and paint vehicle to satisfactory fineness by means of roller or pebble mills. The mix-in pigment being tested must equal these panels in order to be considered satisfactory.

The second method is to thin the paint to a consistency of 5N, as determined on the aforementioned modified Stormer viscometer, by addition of about 20 cubic centimeters of petroleum spirits, or other suitable thinner, per 100 grams of paint. The thinned paint is then spun out on a glass or "Pyralin" slide. This spinout is made by first rotating the slide at a rapid speed and then pouring the paint on the slide at the center. This gives a sample slide or panel which is uniformly coated with a thin film of a low pigment concentration paint. The prepared slides are then compared against standard slides, made in the same manner from prior art ground paints, prepared as were those used in the first method, and thinned with mineral spirits to the same consistency as the paints being tested.

As hereinbefore stated, the amount of linseed oil vehicle required to produce pastes and paints of definite consistencies depends upon the nature of the pigment under test. For example, a low oil absorption lithopone when tested by the hereinabove mix-in grit test gave a penetrometer reading of 25 mm. when 500 grams of said lithopone was mixed with 100 grams linseed oil vehicle. Upon dilution with additional linseed oil vehicle it was found that the resultant paint, having a consistency of 7.5N, comprised 57% pigment by weight. On the other hand, a high oil absorption lithopone when mixed, as was the low oil absorption pigment, gave a penetrometer reading of 25 mm. only when 500 grams of said high oil absorption lithopone was mixed with 125 grams linseed oil vehicle. Upon dilution with additional linseed oil vehicle to a consistency of 7.5N, the resultant high oil absorption lithopone paint comprised only 53% pigment by weight.

*Mix-in pigment particle size*

The term "mix-in pigment particle size," as employed herein and in the appended claims, refers to the size of the discrete particles and aggregates of a dried finished pigment in a paint composition prepared by simple mixing of pigment and paint vehicle. More particularly it relates to the number of discrete pigment particles or aggregates of pigment particles in said paint composition which are larger than a predetermined size such as 6 microns, 8 microns or 15 microns.

In determining mix-in pigment particle size, the pigment-linseed oil vehicle paste consisting of 500 grams pigment and 250 grams linseed oil vehicle, (which vehicle consists of 52% by weight "Z" body kettle bodied linseed oil of 11 acid number and 48% by weight petroleum spirits), prepared as described in the hereinbefore mix-in grit testing method, is removed from the pony mixer and a sample of said paste is diluted to a concentration of 1.163 cubic centimeters pigment per liter thinned paint by stirring with an additional amount of the linseed oil vehicle used in the preparation of said paste. In the case of lithopone this corresponds to the provision of a thinned paint comprising 5 grams pigment per liter. A sample of the thinned paint so obtained is placed in a 100 micron deep glass cell and examined at 500 diameters magnification using transmitted light from a carbon arc. A pigment which by this test shows less than 100 particles per 0.00025 cubic centimeter of thinned paint, that are larger than 6 microns in diameter and not more than one that is larger than 11 microns in diameter, is defined as having a mix-in pigment particle size of 6 microns, and may be readily incorporated in a paint vehicle by simple mixing to produce a paint which forms paint films of a perfect mirror-like appearance. A pigment which shows less than 100 particles that are larger than 8 microns and not more than one larger than 13 microns per 0.00025 cubic centimeter is defined as having a mix-in pigment particle size of 8 microns, and may be readily incorporated in an enamel paint vehicle by simple mixing to produce an enamel paint which forms a smooth glossy paint film eminently suited for high grade enamel finishes. A pigment which by the above test shows less than 100 particles that are larger than 15 microns and not more than one larger than 20 microns is defined as having a mix-in pigment particle size of 15 microns, and is particularly adapted to making flat paints of the interior wall finish types and may be readily incorporated in a paint vehicle by simple mixing to produce a paint which forms films of smooth unbroken surface without any irregularities visible to the naked eye. A pigment which by the hereinabove described mix-in pigment particle size test shows less than 100 particles that are larger than $n$ microns in diameter and not more than 1 particle that is larger than $n+5$ microns in diameter is defined herein and in the appended claims as having a mix-in pigment particle size of $n$ microns. A lithopone, for example, meeting these requirements will contain less than 100 particles larger than $n$ microns in diameter and not more than 1 particle larger than $n+5$ microns in diameter, in $12.5 \times 10^{-7}$ grams pigment, which appear as particles of the above mentioned sizes in a paint prepared by simple mixing of pigment and vehicle.

It is to be understood that the values for mix-in pigment particles size, as hereinabove determined differ markedly from those for pigment particle size as heretofore determined by prior art testing methods. Mix-in pigment particle size is an actual measure of the fineness of a pigment incorporated in an organic coating composition by simple mixing without milling of said coating composition in a pebble mill, paint roller mill, or the like. On the other hand, prior art pigment particle size measurements give particle size results which in practice are only obtained with difficulty, if at all, after prolonged milling of pigment and coating composition vehicle in such milling devices as pebble mills, paint roller mills, and the like. In preparing the pigment sample for particle size determination by prior art methods, for example, by the tentative standard method E–20–23–T section 10, 1933 of the American Society for Testing Materials, the pigment is dispersed in the vehicle on a microscope slide by prolonged and severe rubbing which effects subdivision or removal of all cemented pigment aggregates. In paint manufacturing practice, however, aggregates are not broken down by simple mixing of pigment and vehicle, and, in fact, often persist after prolonged milling of pigment in vehicle.

*Film particle count test*

The term "film particle count," as employed herein and in the appended claims, refers to the number of particles and aggregates of a dried finished pigment which appear as objectionable grit in a dried film of a paint composition prepared by simple mixing of pigment and paint vehicle. More particularly, it relates to the number of projections above the surface of said film having diameters of 50 microns or more.

A suitable method for determining film particle count comprises mixing 500 grams pigment and sufficient of a vehicle consisting of 75% by weight "Z" body kettle bodied linseed oil of 11 acid number, and 25% by weight petroleum spirits as defined by A. S. T. M. tentative standard D235–26T issued 1926, to provide a pigment-vehicle mixture comprising 35.7% pigment by volume to 64.3% vehicle by volume, for 20 minutes in a pony mixer, such as set forth at page 1283 of Perry's 1934 Chemical Engineers' Handbook, and provided with a receptacle or pot 7 inches in diameter and 5 inches deep, adapted to rotate at the rate of 60 revolutions per minute and the paddles of which pony mixer rotate at the rate of 64 revolutions per minute in the reverse direction. The sides and paddles of the pony mixer are scraped down at the end of 1 minute of mixing time and again at the end of the 20 minute mixing period. The thick pigment-vehicle mixture thereby produced is passed once through a three-roll paint roller mill having rolls 6" in diameter and with 0.003" clearance between said rolls. The first roll in said mill rotates at a speed of 21 revolutions per minute; the second at 63 revolutions per minute; and the third at 189 revolutions per minute. Passage of said mixture through the paint roller mill set with such wide clearance between the rolls effects little if any grinding of the pigment material, but does insure thorough and reproducible mixing of the pigment and vehicle. A 300 gram sample of the resultant mixed paint is diluted with more of the linseed oil vehicle to provide a paint consisting of 17.6% pigment by volume and 82.4% linseed oil-petroleum spirits vehicle by volume. Petroleum spirits are then added with stirring in sufficient amount to produce a paint having a consistency of 5.0N, as determined by the modified Stormer viscometer test described on pages 1273-77 of Perry's "Chemical Engineer's Handbook" (1934). The resultant paint is allowed to stand 20 hours, after which 0.7% by weight of 6% cobalt naphthenate drier and 1.8% of 24% lead naphthenate drier, on the basis of the vehicle weight, are added with stirring. The thinned paint is strained through a 48 thread per inch x 60 thread per inch cotton paint strainer and spun out on a "Pyralin" slide rotating at 480 R. P. M. The film so produced is allowed to dry in a dust-free atmosphere and is then examined at 20 diameters magnification, under illumination at an angle of 18°26′12″, using a high intensity microscope lamp, and the number of projections, noted per 10 square centimeters of paint film, above the surface of said film having diameters of 50 microns or more, are counted. The numerical figure thereby obtained is defined as "film particle count." It is to be understood that the projections above the surface do not necessarily represent pigment particles or pigment aggregates having diameters of more than 50 microns, but that they are projections comprising pigment particles or pigment aggregates plus dried oil film having a total diameter of 50 microns or more. In most instances the pigment particles or aggregates of themselves will be responsible for little more than half the total diameter of said projections.

Having explained the terms to be used herein I can now proceed with a detailed description of my invention.

This invention has as an object the improvement of the grit and fineness properties of pigment materials. A further object is the production of pigment materials of such fineness that they can be mixed with paint vehicles to produce coating compositions, such as enamel and flat paints, without recourse to the grinding operation required with prior art pigment materials. A still further object is the production of a mix-in pigment comprising a minor amount of a polar-nonpolar agent. Additional objects will become apparent from an examination of the following description and claims.

These objects are accomplished by the following invention which broadly comprises adding a polar-nonpolar agent to a deflocculated aqueous pigment suspension.

In a more restricted sense this invention comprises adding to an aqueous pigment slurry between about .01% to about 0.5%, based upon the weight of the pigment in the slurry, of a deflocculating agent. The deflocculating agent employed may be any one of a class of alkaline reacting alkali metal compounds. The alkali metal salts of phosphoric acids have been found to be very effective deflocculating agents. The deflocculation must be controlled closely and I have found that the alkalinity of the slurry should be between a pH of about 7.2 to about 12. To this deflocculated aqueous pigment slurry is added between about 0.1% to about 2%, based upon the weight of the pigment in the slurry, of a substantially water soluble polar-nonpolar agent, preferably a polar-nonpolar agent selected from the group consisting of animal and vegetable fatty acid soaps. The slurry is then dewatered, as by centrifuging or by adding a coagulant and filtering, and the pigment is dried and dry milled.

The preferred embodiment of this invention comprises adding to an aqueous pigment slurry between about .05% to about 0.2%, based upon the weight of the pigment in the slurry, of a sodium salt of pyrophosphoric acid, preferably hydrated sodium pyrophosphate. The alkalinity of the deflocculated slurry is controlled between a pH of about 8 to about 10. To this deflocculated aqueous pigment slurry is added between about 0.5% to about 1%, based upon the weight of the pigment in the slurry, of a substantially water soluble polar-nonpolar agent, preferably a sodium soap of coconut oil fatty acid. A coagulant, preferably sulfuric acid, is added in a sufficient amount to reduce the pH of the pigment suspension to about 3.5. Thereafter the pH of the pigment suspension is adjusted to above about 7 by addition of barium hydroxide and the pigment is filtered, dried, and dry milled.

I am aware that U. S. Patent 1,722,174 discloses a process of improving the mixing and dispersing properties of lithopone in paint vehicles which comprises treating the calcined lithopone with a water-soluble soap. I am also aware that U. S. Patent 1,978,727 also discloses a process of improving the dispersing properties of lithopone in paint vehicles which comprises adding a small amount of a salicyl compound to the calcined lithopone. I am also aware that U. S. Patent 2,068,066 also discloses a process of improving the smoothness of paints made by grinding pigment materials in paint vehicles which comprises treating said pigment materials with an aliphatic organic acid. However, my process is distinguished from these disclosures as well as other prior disclosures and methods by obtaining a deflocculated pigment suspension which remains as such prior to, and during the treatment with the polar-nonpolar agent, which I effect by addition of a sufficient amount of a deflocculating agent prior to the addition of the polar-nonpolar agent. In the prior art processes wherein no deflocculating agent is added before the addition of said polar-nonpolar agent, the flocculated particles adhere to each other leaving only a portion of their surfaces free to become coated by the polar-nonpolar agent. As a consequence, such prior art processes produce pigment flocks enveloped by a film of polar-nonpolar agent and do not effect uniform coating of the discrete pigment particles as does my process. Furthermore, on account of said flocculation it is not possible by prior art processes to obtain uniform distribution of tinting materials, such as ultra-marine blue, added to the pigment slurry after introduction of polar-nonpolar agent, whereas, by my process uniform distribution of tinting materials throughout the polar-nonpolar agent treated pigment is obtained easily. Moreover, while the products of these and other prior art processes may be ground in a paint vehicle to produce paints of satisfactory smoothness, they do not, when incorporated in a paint vehicle by simple mixing, produce a paint even sufficiently smooth for use as a flat paint of the interior wall finish type. In addition, such prior art pigments do not have satisfactory mix-in pigment particle size or film particle count as measured by the herein described tests.

Various arrangements and selections of equipment for the operation of my process are possible. In the preferred arrangement, however, I feed an aqueous suspension of unground pigment, containing about 12 parts by weight of water in which is dissolved the deflocculating agent to 1 part by weight of pigment, to a continuous ball or tube mill which is fed by either a tube extending into the end of the mill or by a scoop feeder. In passing through the mill the product is ground and the mill discharge is fed continuously into a hydroseparator or other pigment slurry classifier. The fines are overflowed and the coarse returned to the ball mill. A small amount of a water soluble polar-nonpolar agent is added to the overflow from the hydroseparator tank and said treated overflow is conducted to a smaller mechanically agitated receiving tank to which a coagulant is added. The flocculated suspension is then passed to a second settling tank. The pigment settles rapidly to form a slurry containing about 2 parts water to 1 part pigment. This slurry is filtered, dried and after dry milling, as in a rotary hammer mill, is ready for use.

The following examples are given for illustrative purposes and are not intended to place any restriction on the herein described invention.

*Example 1*

A mixture of coarse and fine calcined lithopone, to which had been added 0.15% hydrated sodium pyrophosphate, was fed to the center of a thirty foot hydroseparator tank at 32° C. The upward rate was 0.015 cm./sec. For this rate the calculated maximum particle size of completely dispersed lithopone in the overflow was 8 microns in diameter. 100 liters of the overflow, containing 80 grams per liter of the completely dispersed pigment, comprising lithopone particles essentially all of a particle size of 8 microns or less, was placed in a suitable container and agitated with a high speed mixer. 640 cubic centimeters of a 10% solution of cotton seed oil fatty acid sodium soap was added to this slurry. The mixture was allowed to agitate for 30 minutes during which time the temperature was raised to 70° C. Sulfuric acid was then added until flocculation was complete (pH of 3.5) and the agitation was stopped. After settling overnight, the supernatant liquid was decanted. The alkalinity of the slurry (one part of pigment to two parts of water) was adjusted with barium hydroxide to a pH of 9.6. After the correct adjustment had been made the batch was filter pressed, dried at 125° C. and disintegrated by passage through a squirrel cage disintegrator. When the finished pigment was tested by means of the texture test, the grading was 17; the paint grit was 16+, i. e. the pigment had substantially perfect texture and paint grit. When this pigment was tested by means of the mix-in test, it was found that the lithopone pigment of my invention, when incorporated in the linseed oil vehicle by mixing only in a pony mixer, produced a coating equal to that of a corresponding prior art lithopone prepared according to the process of U. S. Patent 1,826,131, when given a tight (0.0005 inch clearance) roller mill paint grind. Furthermore, the lithopone product of my invention had a mix-in pigment particle size of 8 microns and a film particle count of 35. The prior art lithopone had a texture of 13, a paint grit of 9, a mix-in grit definitely inferior to that of the lithopone of my novel process, a mix-in pigment particle size of 25 microns, and a film particle count of 215.

*Example 2*

750 grams calcined lithopone was placed in a gallon ball mill. 1.5 liters water and 3 grams hydrated sodium pyrophosphate were added. The mixture was allowed to grind for 24 hours. Upon completion of this time, the contents were removed and placed in a large elutriating funnel. Water at 30° C. was run into the bottom at a rate controlled to give an overflow rate of 108 cubic centimeters per minute. This overflow rate corresponded to a theoretical particle size of 6 microns. When the collected overflow had reached a concentration of 50 grams per liter and a total weight of 400 grams of pigment, the elutriation was stopped. The dilute slurry was treated with 0.8%, based on the pigment, of the sodium soap of coconut fatty acid. The soap was in the form of a 5% solution; 64 cubic centimeters was used. The resultant dispersed pigment suspension was agitated for 15 minutes and then coagulated by acidification with sulfuric acid to 3 pH. The thickened slurry was finished in the usual manner. When this pigment was tested for texture, paint grit, mix-in pigment particle size, mix-in grit, and film particle count, the following gradings were obtained: texture, 17; paint grit, 16; mix-in pigment particle size, 6 microns; film particle count, 21; and mix-in grit equal to that of corresponding prior art calcined hydroseparated lithopone when given a tight enamel grind in the same vehicle. The prior art calcined pigment when finished in the normal manner had a 12 texture, a 10+ paint grit, a 35 micron mix-in pigment particle size, a film particle count of 295, and a mix-in grit definitely inferior to that of the lithopone of my invention. In other words, the novel product of my invention produced enamel paints when simply mixed in paint vehicle whereas the prior art lithopone required prolonged milling in paint vehicle to effect equal results.

*Example 3*

Partially ground low oil absorption lithopone, to which had been added 0.1% hydrated sodium pyrophosphate, was fed to a 30 foot hydroseparator tank at 32° C. The upward rate was 0.014 cm./sec. and corresponded to a theoretical maximum particle size of 7.7 microns. The overflow comprising 2 pounds pigment to 3 gallons water was continuously treated with 0.5%, on the basis of the pigment weight, of the sodium soap of an animal fatty acid (chiefly oleic). This treatment was continued for eight hours until 20 tons of pigment was obtained. The dilute slurry was acidified to 3.5 pH with sulfuric acid and allowed to settle until a density of 4 pounds pigment per gallon of slurry was obtained. The alkalinity of the slurry was adjusted to a pH of 9.8 with barium hydroxide. The finished slurry was filter pressed, dried at 130° C. and disintegrated by passage at the rate of 7,000 lbs./hr.

through a 24 inch rotary hammer mill. When this pigment was tested for mix-in properties, a texture of 17, a paint grit of 16+, a mix-in pigment particle size of 8 microns, a film particle count of 30 and a mix-in grit equal to that of a prior art standard lithopone when given a tight enamel grind in the same vehicle, were obtained. When the same pigment was dispersed with 0.5% sodium silicate and the overflow flocculated according to prior art processes before the addition of the polar-nonpolar agent, the finished pigment had a 13+ texture, a 12 paint grit, a 30 micron mix-in pigment particle size, a film particle count of 248, and a mix-in grit definitely inferior to that of the lithopone of my invention. When mixed in a paint vehicle, in a pony mixer for example, my novel pigment produced an enamel paint of high gloss whereas the prior art pigment produced a paint too gritty even for use as an interior flat wall paint.

*Example 4*

600 grams calcined lithopone was placed in a gallon ball mill. 1.6 liters water and 4 grams hydrated sodium pyrophosphate were added and the mixture was allowed to grind for 48 hours. Upon completion of this time, the contents were removed and diluted to 8 liters with water. This dilute slurry was examined for particle size and was found to contain no particle larger than 10 microns. The texture of this material dried in alcohol and ether was found to be 17. To this slurry was added 60 cubic centimeters of a 10% solution of sodium naphthenate (0.75% of soap based on the pigment). This mixture was agitated for 20 minutes and then acidified with sulfuric acid to a pH of 3.5. After settling, the thickened slurry was finished in the usual manner. The tests made on the finished pigment were as follows: texture, 16+; paint grit, 16; mix-in pigment particle size, 10 microns; film particle count, 45; mix-in grit equal to that of a corresponding prior art lithopone given a medium (0.001 inch clearance) roller mill paint grind.

*Example 5*

Partially ground calcined titanium dioxide slurry containing 0.15% sodium hydroxide and overflowing from a hydroseparator tank at a 4 micron rate was allowed to overflow for 24 hours before a sample was taken. 300 liters of this overflow containing 190 grams titanium dioxide per liter was agitated in a 100 gallon tank. This slurry was completely dispersed when viewed under a microscope, substantially no particle being larger than 5 microns in diameter. 265 grams triethanolamine-coconut oil ester interchange compound was added. The dispersion of the slurry after two hours was unaffected by the treating agent, i. e. it did not flocculate or settle. 0.35% $MgSO_4.7H_2O$ and 0.14% $H_2SO_4$ were added to flocculate the pigment. The slurry was at a pH of 7.1. This dilute slurry was allowed to settle 16 hours when a density of 320 grams pigment per liter was observed. The pigment was filtered, dried at 130° C., and disintegrated in the usual manner. The finished product was tested for texture, paint grit, mix-in pigment particle size, film particle count, and mix-in grit. The results were as follows: 16+ texture, 16 paint grit, 10 micron mix-in pigment particle size, 50 film particle count, and a mix-in grit equal to that obtained with a corresponding prior art calcined titanium dioxide ground in the paint vehicle on a roller mill with rolls set 0.001 inch apart. When the calcined titanium dioxide pigment was dispersed with 0.15% sodium hydroxide and elutriated at a 4 micron rate but not treated with a polar-nonpolar agent the results were as follows: 14 texture, 13 paint grit, 25 micron mix-in pigment particle size, 212 film particle count, and a mix-in grit definitely inferior to that of the titanium dioxide of my novel process. In other words, the dry product of my novel process was essentially as finely divided as was the dispersed hydroseparated aqueous pigment suspension. On the other hand, the prior art dry titanium oxide pigment was relatively coarse and gritty.

*Example 6*

To an aqueous slurry of calcined medium oil absorption lithopone, comprising 1 lb. lithopone per gallon of water, were added 0.5% sodium silicate and 0.04% sodium pyrophosphate on the basis of the weight of the lithopone, as said slurry was fed continuously at the rate of 10,000 gallons per hour to a wet grinding system equipped with hydroseparator tank. To the overflow from the hydroseparator tank, comprising approximately 1 lb. per gallon of lithopone particles substantially perfectly dispersed and having a particle size of less than 6 microns, was continuously added 15%, based on the weight of the pigment, of a 6.7% solution of sodium soap of coconut fatty acid in water. The resultant treated overflow was then coagulated by addition of sulfuric acid to a pH of between 2.5 and 3 and the coagulated slurry thickened to a concentration of approximately 3 pounds per gallon. Zinc sulfate was added in amount sufficient to provide a lithopone, on subsequent neutralization, comprising 0.12% ZnO, and the pH of the pigment slurry was adjusted to 7 by addition of barium hydroxide. A slurry of neutral, coagulated, calcined titanium dioxide was then added in amount sufficient to provide a mixed pigment comprising 15.5% $TiO_2$ and 84.5% lithopone. The resultant pigment slurry was agitated sufficiently to effect uniform distribution of the titanium dioxide, when said slurry was adjusted to a pH of 9.8 by addition of barium hydroxide, filtered, and the pigment dried at 130° C. and dry milled by passage at the rate of 7000 lbs./hr. through a 24 inch rotary hammer mill. The resultant novel product of my invention had a texture of 17+, a paint grit of 16+, a mix-in pigment particle size of 8 microns, a film particle count of 29, and a mix-in grit definitely superior to that of a prior art pigment prepared in an identical manner except that the treatment with coconut fatty acid soap was omitted. The prior art pigment had a texture of 14, a paint grit of 13, a film particle count of 185 and a mix-in pigment particle size of 21 microns.

It is to be understood that the hereinbefore disclosed specific embodiments of my invention may be subject to variation and modification without departing from the scope of this invention. For instance, the deflocculated pigment suspension should not be too concentrated as high concentration of solids interferes with the separation of the coarse and fine particles and also interferes with the uniform absorption of the polar-nonpolar agent in the form of a film on the surface of the discrete pigment particles. Appreciable effects are obtained with concentrations of as high as 1 part pigment to about 2 parts water. For increased effects concentrations of as low as 1 part pigment to more than about 20 parts water may be used although such dilute concentrations are ordinarily avoided on account of economic considerations. For most ordinary purposes, concentrations of 1 part pigment to from about 7 to about 15 parts of water are preferred.

The deflocculation of the pigment in an aqueous solution is an essential step in my process. Ordinary aqueous suspensions of pigment materials are not deflocculated. When polar-nonpolar agents are added to such suspensions, complete coverage of the discrete pigment particle surfaces is not effected. As stated above, the deflocculation must be controlled closely and I have found that the alkalinity of the slurry should be between a pH of about 7.2 to about 12, and preferably between about 8 and about 10.

The particular type of deflocculating agent which is employed in my herein described invention is of great importance. Alkaline earth metal compounds, including magnesium compounds, do not produce deflocculation even at the above pH values. On the contrary, they tend to flocculate the pigment materials. I have found that it is essential in my process that there should be substantially no soluble alkaline earth compounds present in the pigment suspension prior to the addition of the polar-nonpolar agent. The deflocculating agent employed may be any one of the class of alkaline reacting alkali metal compounds, which term includes ammonium compounds, or any combination of said alkali metal compounds. Sodium hydroxide, potassium hydroxide, ammonium hydroxide, sodium carbonate, potassium carbonate, sodium silicate, potassium silicate, sodium aluminate, potassium aluminate, sodium phosphates, and potassium phosphates are examples of deflocculating agents suitable for use in my novel process. However, my preferred agents, because of their superiority over other agents, are alkali metal salts of phosphoric acids, i. e. orthophosphoric acid, pyrophosphoric acid, and metaphosphoric acid. The alkali metal salts of the phosphoric acids which I prefer to employ are the sodium salts of pyrophosphoric acid, either as the hydrated salt, $Na_4P_2O_7.10H_2O$, or the anhydrous salt, $Na_4P_2O_7$.

The optimum amount of deflocculating agent which is employed can best be learned by experimental trial. With the agent which I have found most satisfactory, viz., hydrated sodium pyrophosphate, appreciable effects are obtained by addition of an amount as small as 0.01% of agent, based upon the weight of the pigment in the slurry. For increased effects, as much as about 0.5% and even as high as about 1% hydrated sodium pyrophosphate may be used. If an amount of deflocculating agent substantially greater than about 1% is used it deleteriously affects the fineness properties of the finished pigment. I prefer to add the deflocculating agent in just a sufficient amount that a slurry comprising pigment and water in the proportion of 1 part pigment to about 7 parts water does not show any settling on standing for 10 minutes and contains no visible flocculates. For most ordinary purposes, the preferred amount of deflocculating agent used corresponds to between about 0.05% to about 0.2% of the weight of pigment in the slurry and the deflocculated pigment suspension has a pH of from about 8 to about 10.

The optimum rate of upward flow of the deflocculated pigment suspension in the hydroseparator tank will vary with the particular pigment material used, temperature, type and quantity of the polar-nonpolar agent added to the separator overflow, etc. In a well dispersed suspension, such as that obtained with my preferred deflocculating agent, I have found that at 20° C. a rate of upward flow in the elutriating vessel of about 0.04 cm./sec. with calcined lithopone results in an overflow fraction constituting a deflocculated suspension of pigment particles having substantially all a particle size of about 15 microns or less. Addition of my preferred polar-nonpolar agent to this deflocculated pigment suspension, and subsequent coagulation, filtration, drying and dry milling results in the formation of dry lithopone having substantially a mix-in pigment particle size of about 15 microns or less, as measured by the herein described mix-in pigment particle size test. This pigment is particularly adapted to making flat paints of the interior wall-finish type. Furthermore, it may be readily incorporated in a paint vehicle by simple mixing to produce a paint which forms films of smooth unbroken surface without any irregularities visible to the naked eye. Under the hereinabove described conditions, decreasing the rate of upward flow in the elutriation vessel to about 0.011 cm./sec. with calcined lithopone results in the formation of a dry pigment having substantially a mix-in pigment particle size of about 8 microns or less, as measured by the herein described mix-in pigment particle size test. This pigment may be readily incorporated in an enamel paint vehicle by simple mixing to produce an enamel paint which forms a smooth glossy paint film eminently suited for high-grade enamel finishes. A further reduction in upward flow in the elutriation vessel to about 0.0064 cm./sec. with calcined lithopone results in the formation of a dry pigment having substantially a mix-in pigment particle size of about 6 microns or less, as measured by the herein described mix-in pigment particle size test. This pigment may be readily incorporated into a paint vehicle by simple mixing to produce a paint which forms a paint film of a perfect mirror-like appearance. The rate of upward flow necessary to eliminate particles above a given size will vary with the temperature. Under the aforementioned conditions the rate practically doubles for a 35° C. rise in temperature.

It is to be understood that the addition of a substantially water soluble polar-nonpolar agent to the deflocculated pigment suspension is an essential step in my process. By the term "polar-nonpolar agent" as used in the herein description and appended claims is meant an organic compound or admixture of organic compounds of which substantially every molecule has one of its extremities of an ionizing character and its other extremity non-ionizing and oil miscible. Furthermore, by the term "polar-nonpolar agent" is meant an organic compound or admixture of organic compounds which, (1), are anion-active having the formula

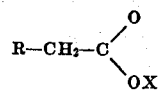

wherein R is an aliphatic or cyclic radical having at least 5 carbon atoms and X is a hydrogen or metal atom, or (2), are cation-active being aliphatic surface-active compounds which in aqueous systems yield positive radicals having an alkyl or substituted alkyl chain containing at least 8 carbon atoms, and/or (3), when employed in the process of U. S. Patent 1,084,361 as substitutes for the soaps disclosed therein, effect transfer of calcined lithopone pigment from the aqueous to the non-aqueous phase. Among the anion-active materials used in the herein described invention are included water soluble soaps such as sodium oleate, sodium stearate, sodium palmitate, sodium laurate, sodium resinate, sodium linoleate, and the like, water soluble salts of alginic acid, sulfonation products of oils such as sulfonated olive oil, sulfonated sperm oil, sulfonated petroleum, and the like, water soluble salts of naphthenic acid such as sodium naphthenate, and sulfated higher alcohols such as sulfated coconut oil alcohols. Among cation-active materials used in the herein described invention are included all materials which in aqueous systems yield positive radicals having at least one aliphatic alkyl or alkoxy alkyl group, with or without substituents, which contains at least 8 carbon atoms. The first species of this general class of agents consists of salts of organic bases which bases are characterized by having at least one basic nitrogen containing residue and at least one long-chain aliphatic residue. The first species can be divided into two groups. As an example of the first of these groups, I may use water-solubilized long-chain amine compounds of either primary, secondary, or tertiary character which may be solubilized by methods including salt formation with water-soluble inorganic acids or by formation of hydroxy or carboxy derivatives of these long-chain amines. As specific representatives of long-chain amines that can be readily solubilized by addition of acids like sulfuric, hydrochloric, etc., I may utilize dodecyl amine, hexadecyl amine, octadecyl amine, and the corresponding secondary or tertiary alkyl derivatives of the same, i. e., dodecyl dimethyl amine, didodecyl amine, octadecyl diethyl amine, etc. As representatives of long-chain amines partially or completely solubilized by relatively water polar groups, such as hydroxy or carboxy derivatives, I may utilize such materials as didodecyl amine ethanol, dodecyl diglycerol amine, dodecyl methylglucamine, esters formed from long-chain alcohols and amino acids, esters formed from fatty acids and hydroxy amines, and by ester interchange with fatty oils and hydroxy amines, etc. A second group of the first species of the above nitrogen-containing species consists of quaternary ammonium compounds containing at least one long alkyl or alkoxy alkly chain containing 8 or more carbons. Representative compounds of this class includes octadecyl trimethyl ammonium bromide, hexadecyl trimethyl ammonium bromide, dodecyl pyridinium sulfate, dodecyl pyridinium bromide, dodecyl pyridinium chloride, hexadecyl pyridinium bromide, octadecyl pyridinium bromide, octadecyl oxymethyl pyridinium chloride, octadecyl choline chloride, etc. Long-chain betaines such as octadecyl betaine are useful for my purpose, being related to this type of species. A second species of the class operative in the present invention consists of water soluble salts of organic compounds which are characterized by having at least one ternary sulfonium residue to which is attached at least one alkyl chain containing 8 or more carbons. As specific representatives of this species including compounds in which the sulfur atom has a positive valence of four are to be included: Methyl benzyl stearyl sulfonium methyl sulfate, lauryl dimethyl sulfonium methyl sulfate, etc. A third species of the class operative in the present invention includes phosphorous compounds similar in structure to the nitrogen-containing compounds described under the first species. They include water-soluble salts of organic compounds which are characterized by having at least one phosphonium residue to which is attached at least one aliphatic group containing an aliphatic residue of at least 8 carbon atoms.

In my preferred process the mixture of deflocculated pigment slurry and water soluble polar-nonpolar agent is agitated sufficiently well to obtain uniform distribution of the polar-nonpolar agent throughout the mixture. This can be done in a small tank equipped with mechanical agitation. However, it has been found that conveyance of the slurry through a pipe results in sufficient mixing. The temperature at which the aforementioned treatment is made is not essential to the success of my invention although elevated temperatures aid in the formation of a uniform mixture.

The optimum amount of polar-nonpolar agent employed can best be learned by experimental trial. Appreciable effects are obtained by addition of amounts as small as about 0.1% of a polar-nonpolar agent, based upon the weight of the pigment in the slurry. For increased effects, as much as about 2% of the agent may be used. It has been found that an amount in excess of 2% has no beneficial effect and in many instances is actually detrimental. For most ordinary purposes, I prefer to use from about 0.5% to about 1% of the polar-nonpolar agent.

The amount and type of flocculating agent used prior to filtration can best be learned by experimental trial and will vary with the type and previous history of the pigment material, the type and quantity of deflocculating agent employed, and the type and quantity of polar-nonpolar agent which is added. My preferred coagulant is sulfuric acid and I prefer to add it in an amount sufficient to reduce the pH of the pigment suspension to about 3.5. However, it is to be understood that the pH of the flocculated pigment suspension should be adjusted to 7 or higher prior to filtration of said suspension. Such adjustment may be effected by addition of alkaline compounds, preferably barium hydroxide.

While I prefer to effect dewatering of my polar-nonpolar agent treated pigment dispersion by adding flocculating agent to said dispersion, allowing the resultant coagulated pigment suspension to settle to form a thick slurry, and thereafter filtering said slurry to produce a dewatered pigment comprising from about 40 to about 65% pigment by weight, it is to be understood that dewatering may be effected by other methods well known in the art. For example, the dispersed pigment suspension may be dewatered by centrifuging with or without addition of coagulant or flocculating agent.

While the temperature at which the dewatered pigment is dried, preferably should not exceed about 180° C., higher temperatures may be employed. However, unless the pigment is dried at subatmospheric pressures, drying temperatures of less than about 100° C. should be avoided or the process becomes too prolonged and commercially impractical.

I have found it very desirable in practicing my invention to effect hydroseparation of the pigment according to processes such as those described in U. S. Patents 1,826,131, 1,937,037 and 2,044,941, and thereafter to add a polar-nonpolar agent to the deflocculated, deflocculating agent comprising, overflow suspension of such processes. However, it is to be understood that hydroseparation is not a part of this invention and is not an essential step in my process. For example, the polar-nonpolar agent may be added to an aqueous, deflocculating agent comprising, wet milled, calcined pigment dispersion which has not been hydroseparated. While I prefer to employ in my process pigment which has been wet milled and/or hydroseparated so that the aforementioned pigment dispersion is substantially free of pigment particles having a diameter greater than about 15 microns, and the product of my process has a mix-in pigment particle size of about 15 microns or less, it is to be understood that the polar-nonpolar agent may be added to an aqueous, deflocculating agent comprising, calcined pigment dispersion comprising a relatively large amount of pigment particles having a diameter greater than about 15 microns, and producing by my process a pigment suitable for direct incorporation into coating composition vehicles by simple mixing, whereby a homogeneous pigment-vehicle mixture is formed, said pigment having a mix-in pigment particle size substantially greater than about 15 microns.

The dried pigment obtained by my novel process is in a relatively soft and powdery condition. The polar-nonpolar agent distributed uniformly over the surface of the individual pigment particles in the presence of my pigment deflocculating agent completely prevents cementation of the soft pigment flocks during the drying process. As a consequence, simple dry milling comminutes the dried pigment so that on simple mixing in paint vehicle it is reduced substantially to the state of subdivision existant in the aforesaid deflocculated pigment suspension. I prefer to dry mill by disintegrating as in a rotary hammer mill, although pulverizing as in a ring roll mill may be resorted to.

While my process is applicable to substantially water-insoluble pigment materials, or admixtures of substantially water-insoluble pigment materials, consisting in whole or in part of such pigments as titanium oxide, titanates, zirconium oxide, zirconium silicate, barium titanium silicate, blanc fixe, ground barytes, magnesium silicates, clay, lithopone, calcium carbonate, barium carbonate, silica, aluminum silicates, zinc sulfide, zinc oxide, antimony oxide, white lead, alumina, magnesium fluoride, calcium, fluoride, carbon pigments, ultramarine blue, chrome yellow, basic zinc chromate, chrome red, chrome orange, barium chromate, chrome green, iron blue, earth colors such as iron oxide, water insoluble dyestuffs such as para-red and toluidine red, acid dyestuffs such as pigment scarlet and lithol red, extended colors, and the like, it is to be understood that it is particularly adapted to substantially water-insoluble white pigment materials, especially "zinc sulfide pigments," by which term is meant substantially water-insoluble white zinc sulfide comprising pigments, for example, zinc sulfide, lithopone, and zinc sulfide extended with such substantially water-insoluble white materials or admixtures of such substantially water-insoluble white materials as barium sulfate, titanium oxide, titanates of divalent metals, zirconium oxide, magnesium silicates, and the like. It is further to be understood that in the case of such pigments as titanium dioxide, lithopone, and the like, which are calcined during the process of manufacture of said pigments, the deflocculating and polar-nonpolar agents are added to the calcined pigment and not to the pigment before the calcination operation.

The ready adaptability to direct mix-in which pigment substances treated in accordance with my invention afford will be evident at once upon evaluating and testing such treated substances, in accordance with the mix-in pigment particle size and film particle count tests referred to. Prior art pigment materials exhibit mix-in particle size values in excess of substantially 20 microns and film particle size count values ranging from above 150 to in excess of 200. In order to render such pigment materials useful in paint compositions they must be ground for prolonged periods in the coating composition vehicle. In the present invention, on the other hand, treatment of pigment or dyestuff-useful substances affords obtainment of a product which will meet all mix-in particle size and film particle count test requirements. The product thus becomes admirably suited for direct use and without any further grinding in the vehicle as a mix-in pigment. For instance, by following the teachings set out herein, pigments can be produced which never exhibit a mix-in particle size value in excess of substantially 15 microns or a film particle count value in excess of substantially 60. Usually and preferably, my novel products exhibit mix-in pigment particle size values not exceeding substantially 6 microns with film particle size count values not in excess of substantially 30. While ordinarily my pigment product exhibits mix-in pigment particle size values below substantially 6 microns, it will be found, when its value is at, say, 6, 8 or 15 microns, less than 100 particles thereof will possess diameters in excess of these figures or sizes.

My comminution process possesses advantages not previously combined in a single process. Furthermore, the products of my process possess advantages not previously combined in a single pigment material. For example, my novel process allows the production of dry calcined substantially water-insoluble pigment materials, such as lithopone, which are finely divided to an extent heretofore unrealized by any commercially practicable prior art process or combination of processes and which, without recourse to the paint grinding operation required with prior art calcined pigment materials, may be incorporated in a paint vehicle by simple mixing, in a pony mixer for example, to produce a paint which forms films of smooth unbroken surface without any irregularities visible to the naked eye. Furthermore, dry calcined substantially water-insoluble pigments of any predetermined particle size may be produced by my process, thus permitting the formulation of paints by simple mixing which will yield films of any predetermined gloss characteristic and of smooth unbroken surface. Moreover, on account of the fact that the polar-nonpolar agent treated aqueous pigment suspension of my invention is in a substantially deflocculated condition, tinting agents, such as ultramarine blue added to aqueous suspensions of lithopone during the process of manufacture of said pigment to neutralize the yellow tint of the lithopone, may be mixed uniformly with the pigment when added to said polar-nonpolar agent treated aqueous pigment suspension.

As many apparently widely different embodiments of this invention may be made without departing from the spirit and scope thereof, it is to be understood that I do not limit myself to the specific embodiments thereof except as defined in the appended claims.

Having described the present invention the following is claimed as new and useful:

1. In a process for the preparation of pigments suitable for incorporation into coating composition vehicles by simple mixing, whereby a homogeneous pigment-vehicle mixture is formed, the steps which comprise deflocculating an aqueous pigment slurry with between 0.01% and about 1%, based on the weight of the pigment of an alkaline reacting alkali metal compound, adding to the deflocculated pigment slurry between about 0.1% and about 2%, based on the weight of the pigment, of a substantially water-soluble polar-nonpolar agent, thereafter dewatering the pigment suspension, and subsequently drying the pigment.

2. In a process for the preparation of pigments suitable for incorporation into coating composition vehicles by simple mixing, whereby a homogeneous pigment-vehicle mixture substantially free of pigment particles larger than 15 microns in diameter is formed, the steps which comprise deflocculating an aqueous pigment slurry with an alkali metal salt of a phosphoric acid, the amount of said salt employed being between 0.01% and about 1%, based on the weight of the pigment, adding between about 0.1% and about 2%, based on the weight of the pigment, of a substantially water-soluble polar-nonpolar agent to the deflocculated pigment slurry, thereafter dewatering the pigment slurry, and subsequently drying the pigment.

3. In a process for the preparation of pigments suitable for incorporation into coating composition vehicles by simple mixing, whereby a homogeneous pigment-vehicle mixture substantially free of pigment particles larger than 15 microns in diameter is formed, the steps which comprise adding to an aqueous pigment slurry between about 0.01% to about 0.5%, based upon the weight of the pigment in the slurry, of an alkaline reacting alkali metal compound, adding to the deflocculated pigment slurry between about 0.1% and about 2%, based upon the weight of the pigment in the slurry, of a substantially water-soluble polar-nonpolar agent, thereafter dewatering the pigment slurry, and subsequently drying the pigment.

4. In a process for the preparation of pigments suitable for incorporation into coating composition vehicles by simple mixing, whereby a homogeneous pigment-vehicle mixture substantially free of pigment particles larger than 15 microns in diameter is formed, the steps which comprise adding to an aqueous pigment slurry between about 0.01% to about 0.5%, based upon the weight of the pigment in the slurry, of an alkali metal salt of pyrophosphoric acid, adding to the deflocculated pigment slurry between about 0.1% and about 2%, based upon the weight of the pigment in the slurry, of a substantially water-soluble polar-nonpolar agent, dewatering the pigment slurry, and subsequently drying the pigment.

5. In a process for the preparation of pigments suitable for incorporation into organic coating composition vehicles by simple mixing, whereby a homogeneous pigment-vehicle mixture substantially free of pigment particles larger than 15 microns in diameter is formed, the steps which comprise adding to an aqueous pigment slurry between about 0.05% to about 0.2%, based upon the weight of the pigment in the slurry, of a sodium salt of pyrophosphoric acid, adding to this deflocculated slurry between about 0.5% and about 1%, based upon the weight of the pigment in the slurry, of a substantially water-soluble polar-nonpolar agent, thereafter flocculating the pigment therein, dewatering the flocculated slurry, and subsequently drying the pigment at a temperature not greater than about 180° C.

6. In a process for the preparation of pigments suitable for incorporation into coating composition vehicles by simple mixing, whereby a homogeneous pigment vehicle mixture substantially free of pigment particles larger than 15 microns in diameter is formed, the steps which comprise adding to an aqueous slurry of a calcined lithopone pigment between about 0.01% to about 0.5% based upon the weight of the pigment in the slurry, of an alkali metal salt of pyrophosphoric acid, adding to the deflocculated pigment slurry between about 0.1% and about 2%, based upon the weight of the pigment in the slurry, of a substantially water-soluble polar-nonpolar agent, dewatering the pigment slurry, and subsequently drying the pigment.

7. In a process for the preparation of pigments suitable for incorporation into coating composition vehicles by simple mixing, whereby a homogeneous pigment vehicle mixture substantially free of pigment particles larger than 15 microns in diameter is formed, the steps which comprise adding to an aqueous slurry of a calcined titanium dioxide pigment between about 0.01% to about 0.5% based upon the weight of the pigment in the slurry, of an alkali metal salt of pyrophosphoric acid, adding to the deflocculated pigment slurry between about 0.1% and about 2%, based upon the weight of the pigment in the slurry, of a substantially water-soluble polar-nonpolar agent, dewatering the pigment slurry, and subsequently drying the pigment.

8. In a process for the preparation of pigments suitable for incorporation into coating composition vehicles by simple mixing, whereby a homogeneous pigment vehicle mixture substantially free of pigment particles larger than 15 microns in diameter is formed, the steps which comprise adding to an aqueous slurry of a calcined titanium dioxide-barium sulfate pigment between about 0.01% to about 0.5% based upon the weight of the pigment in the slurry, of an alkali metal salt of pyrophosphoric acid, adding to the deflocculated pigment slurry between about 0.1% and about 2%, based upon the weight of the pigment in the slurry, of a substantially water-soluble polar-nonpolar agent, dewatering the pigment slurry, and subsequently drying the pigment.

CHARLES F. OPPERMANN.